Figure 1:
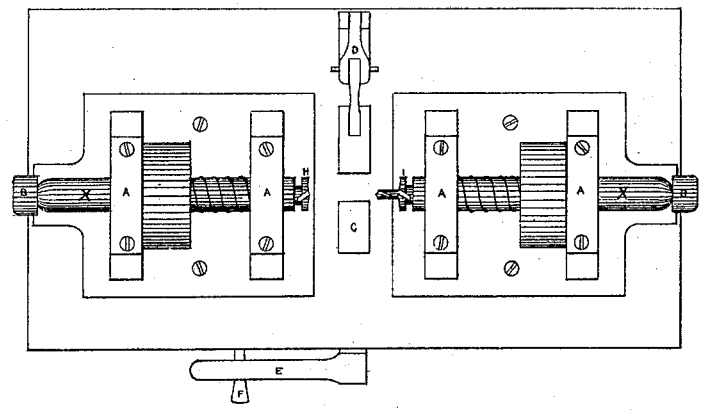
Figure 2:
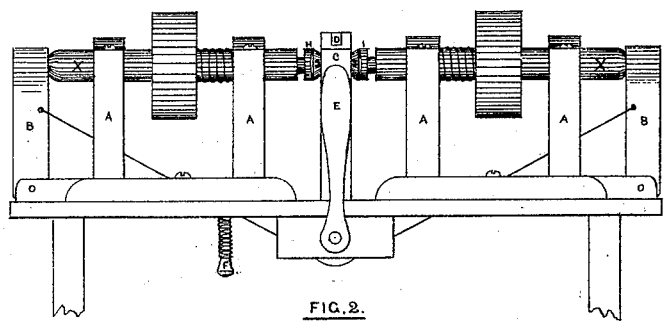
Figure 3:
Figure 4:

Rider & Brownell,
Lathe.

No. 113,798.  Patented Apr. 18, 1871.

WITNESSES.  INVENTORS.

UNITED STATES PATENT OFFICE.

JOHN F. C. RIDER, OF SOUTH NEW MARKET, NEW HAMPSHIRE, AND EMERSON P. BROWNELL, OF PROVIDENCE, RHODE ISLAND.

IMPROVEMENT IN LATHES.

Specification forming part of Letters Patent No. 113,798, dated April 18, 1871; antedated April 10, 1871.

We, JOHN F. C. RIDER, of South New Market, in the State of New Hampshire, and EMERSON P. BROWNELL, of Providence, Rhode Island, have invented a Device for Boring and Smoothing the Ends of Spools, of which the following is a specification:

Figure I, top view of the machine; Fig. II, side view of the same with the spool in place and the cutters smoothing the ends, the auger, combined with one of the cutters, having bored into the end of the spool; Fig. III, side and face view of the cutter H; Fig. IV, side and face view of the cutter I and augur U combined.

Like letters refer to like parts.

A A, the standards upon which rest the sliding spindles X X; B B, the levers which move the spindles; G, the fixed arm of the spool-clamp; D, the lever working the movable arm of the spool-clamp G, the movable arm of the clutch H, the spindle-cutter I, the cutter with auger U combined; F, the lever to which power is applied with the foot to draw the movable arm of the spool-clamp toward the fixed arm; E, the crank which turns the drum upon which wind the cords operating the levers B E.

The machine operates as follows: A piece of stock from the rougher, sawed off about the length of a spool, is held against the fixed arm C of the spool-clamp, and by pressing with the foot upon the lever F by the action of the levers the arm G is brought toward the fixed arm G, and these, pressing against the stock, hold it in its place. The crank F is turned, and the levers B B, acted upon by the cords which are wound about the drum, slide the revolving spindles, and consequently the cutters H and I are brought toward each other and in contact with the spool stock, the auger U first piercing into the head of the stock its full length before the cutter I smooths the head.

The drum and cords attached to the crank E are so adjusted that the cutters approach each other and cut away the stock till the exact length of a spool is acquired. The hole is bored in the end of the spool that it may be thus held upon the spindle of the winder when it receives the thread.

The great art in this part of the process of spool-making is to have the hole in a spool-head exactly at right angles to the line of the face of the spool-head; otherwise irregular winding of the thread is caused and the spool is rendered worthless.

By the invention above described the auger is fixed in such a position that it must always make a hole at right angles with the face.

The cutters H and I consist of a spindle and head made of fine steel. The head is beveled each way from the center line toward the circumference, and incisions are made into the head so that the knife-like cutters are formed by the beveled edge, as shown in Figs. III and IV. Into the head of one of the cutters an auger is placed.

We are aware that somewhat similar machines have been used for the purpose of making awl-handles, buttons, and other similar articles. We therefore distinctly disclaim the several parts of the device as separately considered; but What we do claim is—

The improved spool-heading and boring apparatus herein described, consisting of the reciprocating spindles X, cutter-head H, combined cutter-head and auger I, levers F and B, and spool-clamp D C, with jaws parallel with the spindles, the whole being combined and operating as and for the purposes specified.

JOHN F. C. RIDER.
EMERSON P. BROWNELL.

Witnesses:
J. ERASTUS LESTER,
WILLIAM H. CONY.